United States Patent [19]

Farrington

[11] 4,210,707

[45] Jul. 1, 1980

[54] SEALED LITHIUM-TYPE ELECTROCHEMICAL CELL

[75] Inventor: Gregory C. Farrington, Clifton Park, N.Y.

[73] Assignee: General Electric Company, Schenectady, N.Y.

[21] Appl. No.: 58,066

[22] Filed: Jul. 16, 1979

Related U.S. Application Data

[63] Continuation of Ser. No. 962,009, Nov. 20, 1978, abandoned.

[51] Int. Cl.$^2$ .............................................. H01M 4/36
[52] U.S. Cl. ................................... 429/105; 429/193; 429/194; 429/199
[58] Field of Search ............... 429/101, 105, 193, 194, 429/191, 104, 199, 218

[56] References Cited

U.S. PATENT DOCUMENTS

| | | | |
|---|---|---|---|
| 3,953,233 | 4/1976 | Roth et al. | 429/193 |
| 3,976,505 | 8/1976 | Farrington et al. | 429/193 X |
| 4,027,076 | 5/1977 | Farrington et al. | 429/104 |
| 4,041,215 | 8/1977 | Kormanyos et al. | 429/104 |

*Primary Examiner*—Anthony Skapars
*Attorney, Agent, or Firm*—Paul R. Webb, II; James C. Davis, Jr.

[57] ABSTRACT

A sealed lithium-type electrochemical cell is described which comprises a casing, a lithium-type anode positioned within the casing, a cathode positioned within the casing, the cathode functioning with a lithium-type anode and a solid lithium-sodium beta″-alumina electrolyte, and a solid lithium-sodium beta″-alumina electrolyte positioned within the casing between the anode and cathode and in contact with both the anode and cathode.

4 Claims, 1 Drawing Figure

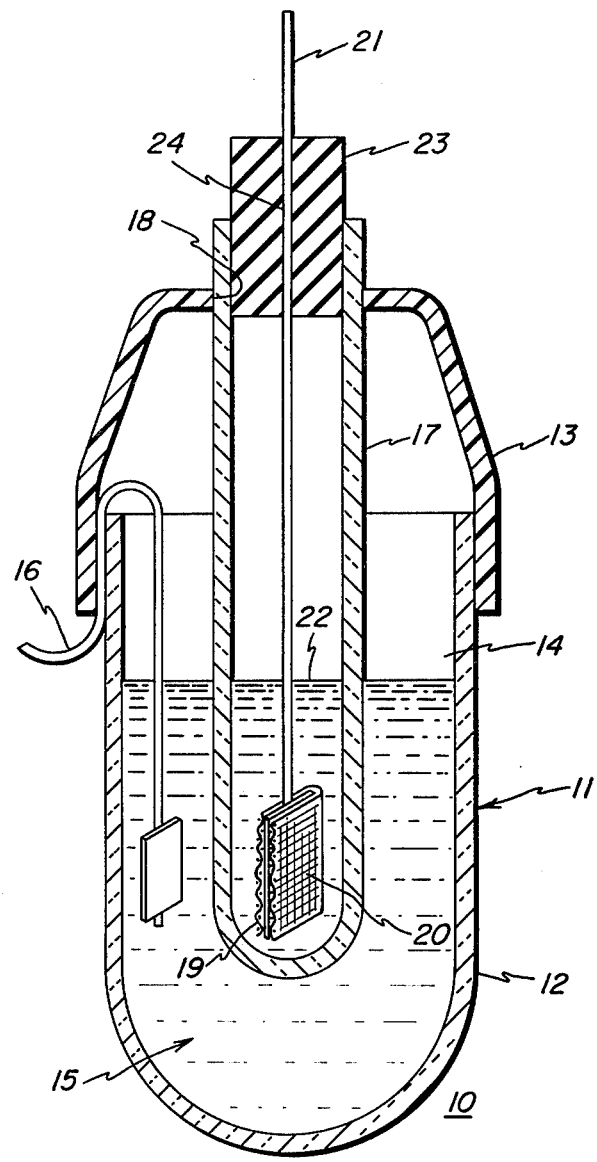

SEALED LITHIUM-TYPE ELECTROCHEMICAL CELL

This is a continuation, of application Ser. No. 962,009, filed Nov. 20, 1978, now abandoned.

This invention relates to sealed cells and, more particularly, to such cells employing a lithium-type anode, a cathode, and a solid lithium-sodium beta"-alumina electrolyte.

Reference is made to U.S. Pat. No. 3,976,505—Farrington, et al entitled "Sealed Lithium-Bromine Cell". This patent describes and claims a sealed cell with a lithium type anode, a bromine cathode, and a solid lithium sodium aluminate electrolyte therebetween. Reference is made to U.S. Pat. No. 4,027,026—Farrington, et al entitled "Sealed Lithium-Sodium Electrichemical Cell" which patent describes and claims sealed cell with a lithium-sodium type anode, a compatible cathode, and a solid lithium-sodium aluminate electrolyte therebetween. Both of these patents are assigned to the same assignee as the present application.

My present invention is directed to a sealed lithium-type electrochemical cell with positive separation of the anode and cathode by a solid lithium-sodium beta"-alumina electrolyte which is lithium ion-conductive.

The primary object of my invention is to provide a lithium-type electrochemical cell which has high cell voltage, high energy density, and a near-zero self-discharge rate.

In accordance with one aspect of my invention, a sealed lithium-type electrochemical cell employs a lithium-type anode, a compatible cathode, and a solid lithium-sodium beta"-alumina electrolyte which is a lithium ion conductor therebetween.

These and various other objects, features and advantages of the invention will be better understood from the following description taken in connection with the accompanying drawing in which:

The single FIGURE is a sectional view of a lithium-sodium electrochemical cell made in accordance with my invention.

In the single FIGURE of the drawing, there is shown generally at 10 a sealed lithium-sodium electrochemical cell embodying my invention. An outer casing 11 comprising a lower casing portion 12 of glass and an upper portion 13 of polyethylene affixed tightly to the upper end of the lower casing portion 11 thereby provides a chamber 14 for a cathode 15 of a concentrated solution of bromine in a non-aqueous solvent with an ionic conductivity enhancing material and a platinum electrode 16. Electrode 16 extends to the exterior of cell 11 through the junction of the lower and upper casing portions 12 and 13. An inner casing 17 in the form of a tube of solid lithium-sodium beta"-alumina electrolyte is positioned within the lower casing portion 12 and immersed partially in cathode 15. An opening 18 is provided in the top of upper casing portion 13 into which tube 17 fits tightly. An anode 19 of lithium-sodium in the form of a lithium-sodium ribbon is pressed onto a nickel mesh 20 which is folded together and attached to the end of a nickel electrical lead 21. An anolyte 22 partially fills tube 17 and is in contact with lithium-sodium anode 19. An electrically insulating closure 23 with a hole 24 therethrough is provided at the upper end of tube 17 to seal the initially open end of the tube. Lead 21 extends through the hole 24 in closure 23 to the exterior of cell 10.

I found that I could form a sealed lithium-type electrochemical cell with a lithium ion-conductive electrolyte by employing a casing having a cathode portion and an anode portion. These two portions are separated by a solid lithium-sodium beta"-alumina electrolyte which will be further described below. Such a casing may be provided in various configurations.

One such cell employs an outer casing comprising a lower casing portion of glass and an upper casing portion of a plastic such as polyethylene affixed tightly to the upper open end of the lower casing portion thereby providing a chamber for a cathode in a catholyte which functions with a lithium-type anode and a solid lithium-sodium beta"-alumina electrolyte. An electrode extends from the cathode to the exterior of the cell through the junction of the lower and upper casing portions. An inner casing in the form of a tube of solid lithium-sodium aluminate electrolyte is positioned within the outer casing and immersed partially in the cathode. An opening is provided in the top of the upper casing portion into which the tube fits tightly. An anode of lithium-type metal in the form of lithium-sodium ribbon pressd onto a nickel mesh is folded together and attached to the end of a nickel electrical lead. An anolyte partially fills the tube and is in contact with the lithium anode. An electrically insulating closure with a hole therethrough is provided at the upper end of the tube to seal the initially open end of the tube. The lead extends through the hole in the closure to the exterior of the cell.

I found that I could employ a lithium-type anode which term includes lithium, lithium as an amalgam, lithium in a non-aqueous electrolyte, a lithium-alloy with from 1.0 weight percent to 99.0 weight percent lithium, a lithium-alloy as an amalgam, and a lithium alloy in a non-aqueous electrolyte. Suitable lithium alloys include lithium-sodium, lithium-aluminum, and lithium-silicon.

The above anodes function with a solid lithium-sodium beta"-alumina electrolyte without greatly increasing the interfacial polarization when water is absorbed on the electrolyte interfaces. Such trace water is always present in the non-aqueous solvents. The solid lithium-sodium beta"-alumina has the formula

$$y(Li\,Na)O.nX.5Al_2O_3$$

wherein y is a range from 0.55 to 1.0; X is an oxide selected from the group consisting of MgO, $Li_2O$, $m(MgO)p(Li_2O)$ wherein the total of m and p equal n; n, is a range from 0 to 1.0; and 1.0 to 99.0 percent of the total alkali ion content is lithium.

When I employ a lithium-type anode the preferred non-aqueous solvent is dioxolane or propylene carbonate with dissolved conductivity salts such as lithium hexafluorarsenate or lithium trifluoromethane sulfonate.

A wide variety of cathodes are suitable which will function with the lithium-type anode and the above-described solid electrolyte. Such suitable cathodes include halogens of chlorine, bromine and iodine; sulfur, phosphorus; a reducible metal salt such as nickel chloride, lead sulfide, silver oxide, cupric fluoride, and lead iodide; a reducible gas such as sulfur dioxide; a reducible sulfur oxyhalide such as thionyl chloride; Fe (III), and oxygen. Each cathode includes an electrode and is contained in a catholyte.

I found that a suitable catholyte for the above cathodes, except for thionyl chloride, Fe(III) and oxygen, was a non-aqueous catholyte of propylene carbonate with lithium hexafluoroarsenate dissolved therein. A suitable aqueous catholyte for Fe (III) and oxygen is 0.1 M nitric acid in water. Thionyl chloride is employed undiluted.

I found that the above cathodes were suitably used in the following manner:

| Cathodes | Manner Used |
| --- | --- |
| Chlorine and sulfur dioxide | Saturated solution in above-described non-aqueous catholyte used with platinum electrode. |
| Bromine and iodine | Concentrated solution in above-described non-aqueous catholyte used with platinum electrode. |
| Sulfur, phosphorous, nickel chloride, lead sulfide, silver oxide, cupric fluoride, and lead iodide. | Each was pressed as anhydrous powder on an expanded nickel mesh cathodic electrode in above-described non-aqueous catholyte. |
| Thionyl chloride | Undiluted. |
| Fe (III) | Concentrated solution of FeCl$_3$ in above-described aqueous catholyte used with platinum electrode. |
| Oxygen | Saturated solution in above-described aqueous catholyte used with platinum electrode. |

Examples of lithium-type electrochemical cells in accordance with my invention are set forth below.

EXAMPLE I

A cell without reactants which is Example I is assembled partially as generally described above and as shown in the single FIGURE of the drawing. The cell is constructed in the same manner with a lithium-sodium beta''-alumina tube with a 50 percent lithium ion content. The remaining alkali ion content of the tube is sodium ions.

The outer casing is formed of a lower casing portion of glass and an upper casing portion of polyethylene adapted to be affixed tightly to the upper open end of the lower casing portion thereby providing a chamber for the cathode in a catholyte including an electrode or electrical lead which extends to the exterior of the cell through the junction of the lower and upper casing portions. An inner casing in the form of a tube of solid lithium-sodium beta''-alumina electrolyte is positioned within the outer casing and adapted to be in contact with the cathode. An opening is provided in the top of each upper casing portion into which the respective tube is fitted tightly. An anode in an anolyte is adapted to be in contact with the inner surface of the tube. An electrical lead is provided to contact the anode. An electrically insulating closure with a hole therethrough is provided at the upper end of each tube to seal the initially open end of the tube. The lead extends through the hole in the closure to the exterior of the cell.

EXAMPLE II

The cell of Example I is employed. The outer casing is filled partially with a concentrated solution of bromine in a catholyte of propylene carbonate with lithium hexafluoroarsenate dissolved therein. A platinum electrode is immersed in the catholyte. The anode consists of 50 weight percent lithium and 50 weight percent sodium, which are mixed together and are pressed onto a nickel mesh which is folded together and attached to the end of a nickel electrical lead. The anolyte fills partially the inner casing or tube that is in contact with the lithium-sodium anode. The anolyte is propylene carbonate with lithium hexafluoroarsenate. An electrically insulating enclosure with a hole therethrough is provided at the upper end of the tube to seal the initially open end of each tube. The lead extends through the hole in the closure to the exterior of the cell. The resulting device was a sealed lithium-type electrochemical cell which is made in accordance with my invention.

While other modifications of the invention and variations thereof which may be employed within the scope of the invention have not been described, the invention is intended to include such as may be embraced within the following claims.

What I claim as new and desire to secure by Letters Patent of the United States is:

1. A sealed lithium electrochemical cell comprising a casing, an anode positioned within the casing, the anode selected from the class consisting of lithium, lithium as an amalgam, lithium in a non-aqueous electrolyte, a lithium-alloy with from 1.0 weight percent to 99.0 weight percent lithium, a lithium-alloy as an amalgam, and a lithium alloy in a non-aqueous electrolyte, a cathode positioned within the casing, the cathode functioning with the anode, a solid lithium-sodium beta''-alumina electrolyte positioned within the casing between the anode and the cathode, the solid lithium-sodium beta''-alumina having the formula $$y(LiNa)O.nX.5Al_2O_3$$

wherein y is a range from 0.55 to 1.0; X is an oxide selected from the group consisting of MgO, Li$_2$O, m(MgO)p(Li$_2$O) wherein the total of m and p equal n; n is a range from 0 to 1.0; and 1.0 to 99.0 percent of the total alkali ion content is lithium.

2. A sealed lithium electrochemical cell as in claim 1, in which the solid lithium-sodium beta''-alumina has the formula $$0.84 (LiNa)O.0.84MgO \; 5Al_2O_3$$

and the total alkali ion content of the electrolyte is 50 percent lithium.

3. A sealed lithium electrochemical as in claim 1, in which the anode consists of 50 weight percent lithium and 50 weight percent sodium, the total alkali ion content of the electrolyte is 50 percent lithium, and the cathode is a concentrated solution of bromine in a catholyte of propylene carbonate with lithium hexafluoroarsenate dissolved therein.

4. A sealed lithium electrochemical cell as in claim 1, in which the anode consists of 50 weight percent lithium and 50 weight percent sodium in an anolyte of propylene carbonate with lithium hexafluoroarsenate, the solid lithium-sodium beta''-alumina having the formula $$0.84(LiNa)O.0.84MgO.5Al_2O_3$$

and the total alkali ion content of the electrolyte is 50 percent lithium, and the cathode is a concentrated solution of bromine in a catholyte of propylene carbonate with lithium hexafluoroarsenate dissolved therein.

* * * * *